US012626943B2

(12) United States Patent
    Inoue

(10) Patent No.: US 12,626,943 B2
(45) Date of Patent: May 12, 2026

(54) FUEL CELL SYSTEM

(71) Applicant: HONDA MOTOR CO., LTD., Tokyo (JP)

(72) Inventor: Tomoyuki Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 547 days.

(21) Appl. No.: 18/124,666

(22) Filed: Mar. 22, 2023

(65) Prior Publication Data

US 2023/0317992 A1      Oct. 5, 2023

(30) Foreign Application Priority Data

Mar. 29, 2022    (JP) ................................. 2022-053076

(51) Int. Cl.
    *H01M 8/04*        (2016.01)
    *H01M 8/04119*    (2016.01)
    *H01M 8/04746*    (2016.01)
    *H01M 8/04992*    (2016.01)

(52) U.S. Cl.
    CPC ...  *H01M 8/04783* (2013.01); *H01M 8/04126* (2013.01); *H01M 8/04753* (2013.01); *H01M 8/04761* (2013.01); *H01M 8/04992* (2013.01)

(58) Field of Classification Search
    CPC ......... H01M 8/04783; H01M 8/04126; H01M 8/04753
    See application file for complete search history.

(56) References Cited

U.S. PATENT DOCUMENTS

| 2001/0010872 A1 | 8/2001 | Suzuki et al. |
| 2012/0258375 A1 | 10/2012 | Fukuma et al. |
| 2017/0346117 A1* | 11/2017 | Ojima ............... H01M 8/04228 |
| 2017/0352899 A1 | 12/2017 | Asai et al. |

FOREIGN PATENT DOCUMENTS

| JP | 2001-216987 A | 8/2001 |
| JP | 2006-147284 A | 6/2006 |
| JP | 2012-221731 A | 11/2012 |
| JP | 2014-063664 A | 4/2014 |
| JP | 2021-072266 A | 5/2021 |
| WO | 2016/027335 A1 | 2/2016 |

OTHER PUBLICATIONS

Office Action dated Jan. 23, 2024 issued in the corresponding Japanese Patent Application No. 2022-053076 A with an English machine translation thereof.

* cited by examiner

*Primary Examiner* — Olatunji A Godo
(74) *Attorney, Agent, or Firm* — Carrier, Shende & Associates P.C.; Fulchand P. Shende; Joseph P. Carrier

(57)        ABSTRACT
The fuel cell system includes a fuel cell stack, a humidifier provided on an oxygen-containing gas supply flow path to humidify an oxygen-containing gas flowing through the oxygen-containing gas supply flow path, a discharge path stop valve provided on an oxygen-containing gas discharge flow path and configured to be opened during power generation by the fuel cell stack, and a pressure regulator provided downstream of the discharge path stop valve to regulate pressure so that it is higher on the upstream side than the downstream side.

5 Claims, 3 Drawing Sheets

FUEL CELL SYSTEM

CROSS-REFERENCE TO RELATED APPLICATIONS

This application is based upon and claims the benefit of priority from Japanese Patent Application No. 2022-053076 filed on Mar. 29, 2022, the contents of which are incorporated herein by reference.

BACKGROUND OF THE INVENTION

Field of the Invention

The present invention relates to a fuel cell system to be mounted on a moving object or the like.

Description of the Related Art

In recent years, fuel cells have attracted attention in various fields. For example, there is a fuel cell vehicle equipped with fuel cells. A fuel cell vehicle is powered by an electric motor running on electricity generated by electrochemical reactions in the fuel cells. For this reason, there is no discharge of $CO_2$, $NO_x$, $SO_x$ and the like as in gasoline-powered vehicles, but only water is discharged, and therefore fuel cell vehicles are environmentally friendly. The fuel cell may be mounted on other moving objects such as ships, aircrafts, robots and so on, in addition to automobiles.

The fuel cell is formed of a membrane electrode assembly (MEA) in which an electrolyte membrane is provided between an anode and a cathode, and a pair of separators provided on both sides of the membrane electrode assembly. The fuel cells are also referred to as a fuel cell stack. JP 2012-221731 A discloses a fuel cell system having a fuel cell.

An oxygen-containing gas supplier constituting the fuel cell system disclosed in JP 2012-221731 A includes an oxygen-containing gas supply flow path, an oxygen-containing gas discharge flow path, a compressor, a supply path stop valve, and a discharge path stop valve disposed in the oxygen-containing gas discharge flow path.

The oxygen-containing gas supply flow path communicates with an oxygen-containing gas inlet of the fuel cell, and the oxygen-containing gas discharge flow path communicates with an oxygen-containing gas outlet of the fuel cell. The supply path stop valve is disposed in the oxygen-containing gas supply flow path, and the discharge path stop valve is disposed in the oxygen-containing gas discharge flow path.

SUMMARY OF THE INVENTION

In a situation where the fuel cell stack has a high temperature at low humidity, there is a tendency that the electrolyte membrane of the fuel cell stack dries so that degradation of the electrolyte membrane is accelerated. In the case where the fuel cell stack is mounted on a vehicle, such a situation in which the fuel cell stack has a high temperature at low humidity is likely to occur during uphill traveling or the like.

When the pressure at the oxygen-containing gas flow field inside the fuel cell stack increases, the amount of water contained in the oxygen-containing gas flowing through the oxygen-containing gas flow field increases. Therefore, it is considered that the drying of the electrolyte membrane can be suppressed by increasing the pressure at the oxygen-containing gas flow field in side fuel cell stack.

However, while the fuel cell stack is generating power, the stop valve disposed in the oxygen-containing gas discharge flow path cannot be closed. Therefore, it is required to increase the pressure in the oxygen-containing gas flow path in the fuel cell stack even when the fuel cell stack is generating power.

An object of the present invention is to solve the above-described problems.

According to an aspect of the present invention, there is provided a fuel cell system including: a fuel cell stack configured to generate electric power by chemical reactions between a fuel gas and an oxygen-containing gas; an oxygen-containing gas supply flow path connected to the fuel cell stack; an oxygen-containing gas discharge flow path connected to the fuel cell stack; a humidifier disposed on the oxygen-containing gas supply flow path and configured to humidify the oxygen-containing gas flowing through the oxygen-containing gas supply flow path; a discharge path stop valve disposed on the oxygen-containing gas discharge flow path and configured to be opened while the fuel cell stack is generating electric power; and a pressure regulator disposed downstream of the discharge path stop valve and configured to regulate a pressure on an upstream side to be higher than a pressure on a downstream side.

According to the aspect of the present invention, even if the discharge path stop valve is opened while the fuel cell stack is generating electric power, it is possible to increase the pressure at the oxygen-containing gas flow field inside the fuel cell stack. As a result, because the amount of water contained in the oxygen-containing gas is increased as compared with the case where the pressure regulator is not provided, drying of the electrolyte membrane can be suppressed.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
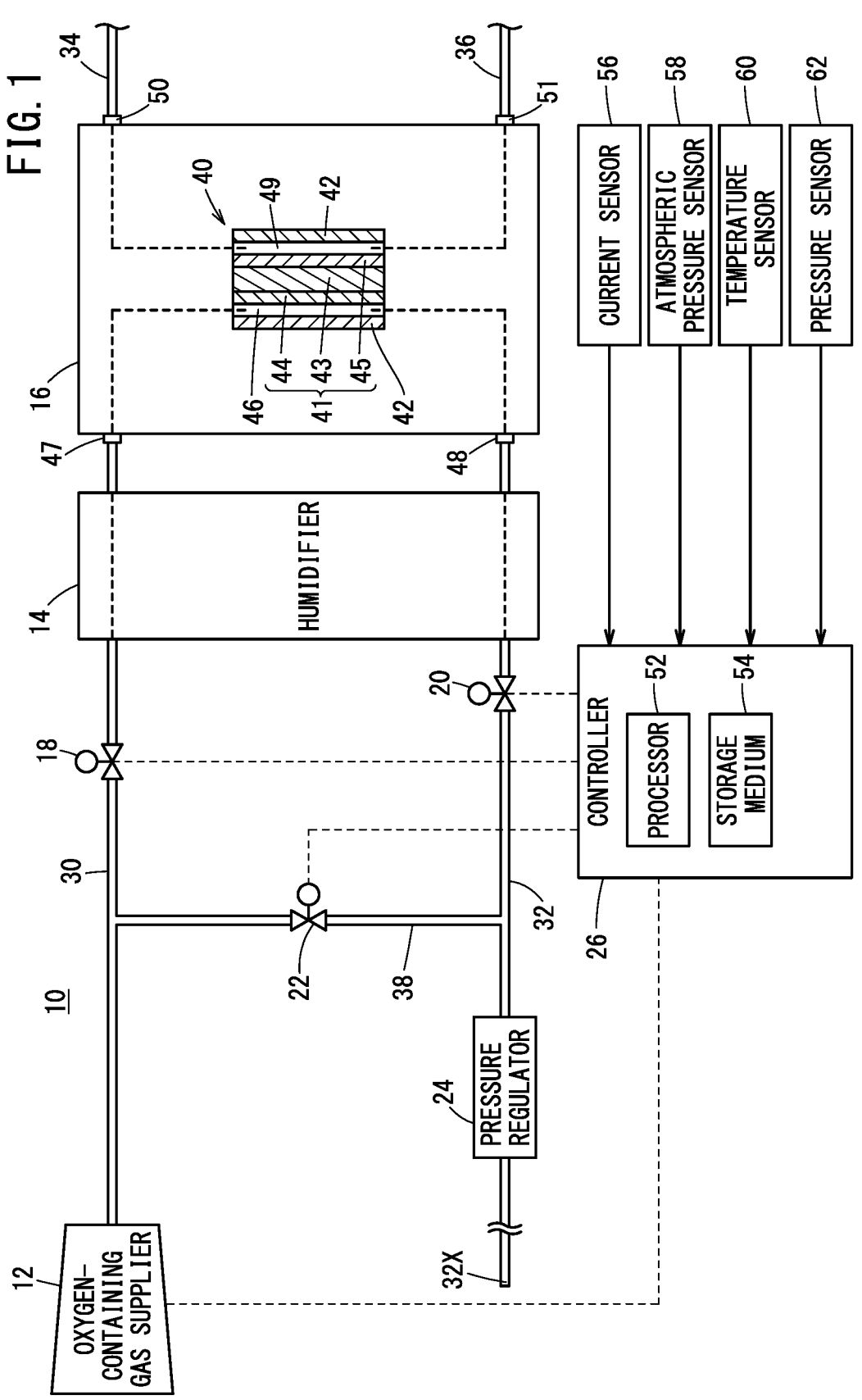
FIG. 1 is a schematic diagram showing a configuration of a fuel cell system according to an embodiment.

FIG. 1 is a schematic diagram showing a configuration of a fuel cell system 10 according to an embodiment. The fuel cell system 10 includes an oxygen-containing gas supplier 12, a humidifier 14, a fuel cell stack 16, a supply path stop valve 18, a discharge path stop valve 20, a bypass valve 22, a pressure regulator 24, and a controller 26.

The oxygen-containing gas supplier 12 is a device that supplies the oxygen-containing gas to the fuel cell stack 16 through an oxygen-containing gas supply flow path 30. The oxygen-containing gas supplier 12 is configured to adjust the flow rate of the oxygen-containing gas to be supplied to the oxygen-containing gas supply flow path 30. The flow rate of the oxygen-containing gas is set by the controller 26. The oxygen-containing gas supplier 12 may be a compressor, but is not limited to a compressor. The oxygen-containing gas may be air, but is not limited to air as long as it is a gas containing oxygen.

The humidifier 14 introduces water vapor into the oxygen-containing gas supply flow path 30 to humidify the oxygen-containing gas flowing through the oxygen-containing gas supply flow path 30. The humidifier 14 collects water contained in the off-gas flowing through an oxygen-containing gas discharge flow path 32 and vaporizes the water into water vapor. The humidifier 14 may introduce the water vapor into the oxygen-containing gas supply flow path 30. The off-gas is a mixed gas containing an oxygen-containing gas and water vapor.

The fuel cell stack 16 generates electric power through electrochemical reactions between a fuel gas and an oxygen-containing gas. The fuel gas is not particularly limited as long as it is a gas containing hydrogen. The fuel cell stack 16 includes a plurality of power generation cells 40.

Each power generation cell 40 includes a membrane electrode assembly (MEA) 41 and a pair of separators 42 sandwiching the membrane electrode assembly 41. The membrane electrode assembly 41, for example, is equipped with an electrolyte membrane 43 in which a thin film of perfluorosulfonic acid is impregnated with water, and an anode 44 and a cathode 45 sandwiching the electrolyte membrane 43.

An oxygen-containing gas flow field 46 is formed on a surface of one of the separators 42, facing the membrane electrode assembly 41. The oxygen-containing gas flow field 46 communicates with an oxygen-containing gas inlet 47 and an oxygen-containing gas outlet 48 of the fuel cell stack 16. The oxygen-containing gas inlet 47 is connected to the oxygen-containing gas supply flow path 30, and the oxygen-containing gas outlet 48 is connected to the oxygen-containing gas discharge flow path 32.

A fuel gas flow field 49 is formed on a surface of the other of the pair of separators 42, facing the membrane electrode assembly 41. The fuel gas flow field 49 communicates with a fuel gas inlet 50 and a fuel gas outlet 51 of the fuel cell stack 16. The fuel gas inlet 50 is connected to the fuel gas supply flow path 34, and the fuel gas outlet 51 is connected to the fuel gas discharge flow path 36.

The oxygen-containing gas flowing toward the fuel cell stack 16 through the oxygen-containing gas supply flow path 30 flows into the fuel cell stack 16 from the oxygen-containing gas inlet 47, and is distributed to the oxygen-containing gas flow field 46 of each power generation cell 40. In each power generation cell 40, the oxygen-containing gas supplied to the oxygen-containing gas flow field 46 reacts with the fuel gas supplied to the fuel gas flow field 49. The mixed gas containing the oxygen-containing gas that has not chemically reacted with the fuel gas and water (water vapor) produced by chemical reactions is collected as an off-gas and discharged from the oxygen-containing gas outlet 48 to the oxygen-containing gas discharge flow path 32. The oxygen-containing gas discharged to the oxygen-containing gas discharge flow path 32 is discharged into the atmosphere from the outlet 32X of the oxygen-containing gas discharge flow path 32.

The supply path stop valve 18 is disposed on the oxygen-containing gas supply flow path 30. The supply path stop valve 18 opens and closes the oxygen-containing gas supply flow path 30 under the control of the controller 26. The supply path stop valve 18 may be a valve that can be opened or closed, or a valve capable of adjusting its opening degree.

The discharge path stop valve 20 is disposed on the oxygen-containing gas discharge flow path 32. The discharge path stop valve 20 opens and closes the oxygen-containing gas discharge flow path 32 under the control of the controller 26. The discharge path stop valve 20 may be a valve that can be opened or closed, or a valve capable of adjusting its opening degree. In the present embodiment, the discharge path stop valve 20 is the valve capable of adjusting its opening degree. The opening degree of the discharge path stop valve 20 is set by the controller 26.

A bypass channel 38 is provided with a bypass valve 22. The bypass channel 38 branches off from the oxygen-containing gas supply flow path 30 and merges with the oxygen-containing gas discharge flow path 32 at a point between the pressure regulator 24 and the discharge path stop valve 20. The bypass valve 22 adjusts the flow rate of the oxygen-containing gas flowing through the bypass channel 38. When the bypass valve 22 is opened, a part of the oxygen-containing gas supplied from the oxygen-containing gas supplier 12 flows into the oxygen-containing gas discharge flow path 32 without passing through the fuel cell stack 16.

The pressure regulator 24 is a device that makes an upstream pressure higher than a downstream pressure. The pressure regulator 24 may be an orifice plate which is formed to have an opening smaller than the opening of the oxygen-containing gas discharge flow path 32. Alternatively, the pressure regulator 24 may be a flow control valve capable of adjusting its opening degree so that the opening of the flow control valve is smaller than the opening of the oxygen-containing gas discharge flow path 32. The pressure regulator 24 is provided downstream of the discharge path stop valve 20. In this way, even if the discharge path stop valve 20 is opened while the fuel cell stack 16 is generating power, it is possible to increase the pressure at the oxygen-containing gas flow field 46 inside the fuel cell stack 16. As a result, because the amount of water contained in the oxygen-containing gas is increased as compared with the case where the pressure regulator 24 is not provided, drying of the electrolyte membrane 43 can be suppressed.

The controller 26 includes a processor 52 such as a CPU or an MPU, and a storage medium 54 including various memories such as a ROM, a RAM, and a hard disk. The processor 52 controls the operation of the fuel cell system 10 by executing various processing in accordance with programs stored in the storage medium 54. A current sensor 56, an atmospheric pressure sensor 58, a temperature sensor 60, and a pressure sensor 62 are connected to the controller 26.

The current sensor 56 detects a current (generated current) obtained by the power generation by the fuel cell stack 16. The atmospheric pressure sensor 58 detects atmospheric pressure. The temperature sensor 60 detects the temperature of the fuel cell stack 16. The temperature sensor 60 is provided, for example, at a coolant outlet of the fuel cell stack 16. The pressure sensor 62 detects the pressure at the oxygen-containing gas flow field 46 formed inside the fuel cell stack 16 (internal pressure at the oxygen-containing gas flow field). The pressure sensor 62 is provided, for example, at the oxygen-containing gas inlet 47 of the fuel cell stack 16.

On the basis of the detection signals output from the current sensor 56, the atmospheric pressure sensor 58, the temperature sensor 60, and the pressure sensor 62, the controller 26 executes adjustment processing for adjusting the flow rate of the oxygen-containing gas supplied to the fuel cell stack 16.

Figure 2:
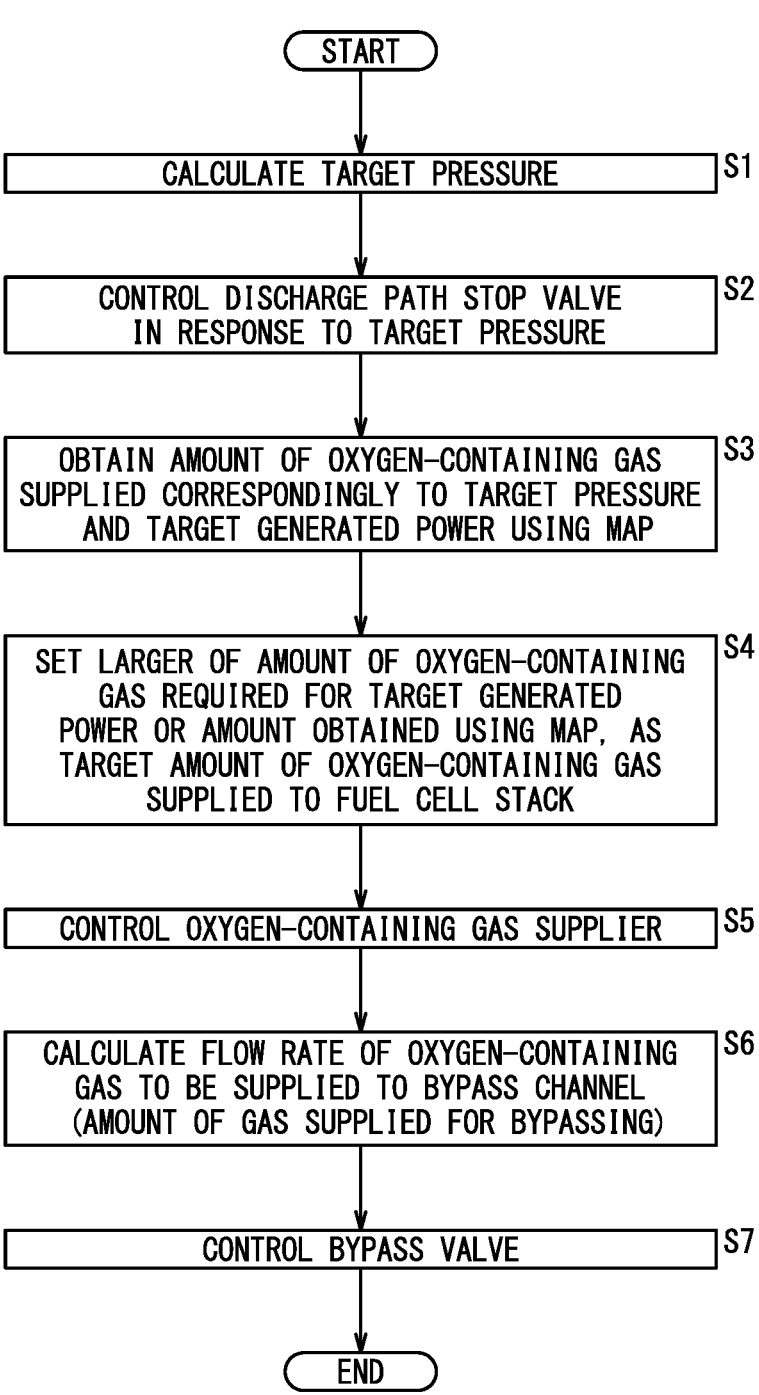
FIG. 2 is a flowchart showing a procedure of adjustment processing.

FIG. 2 is a flowchart showing a procedure of adjustment processing. This adjustment processing is repeatedly executed at predetermined intervals during power generation from the start to the stop of the power generation operation by the fuel cell stack 16.

In step S1, the controller 26 calculates, as a target pressure, a pressure required at the oxygen-containing gas flow field 46 inside the fuel cell stack 16 so that the oxygen-containing gas contains an amount of water that can prevents the electrolyte membrane 43 from drying. The controller 26 can calculate the target pressure based on the current atmospheric pressure detected by the atmospheric pressure sensor 58, the current temperature of the fuel cell stack 16 detected by the temperature sensor 60, and the target generated power amount of the fuel cell stack 16.

The target generated power amount may be instructed from a higher-level controller or the like, or may be calculated by the controller 26. The target generated power amount can be calculated based on, for example, the amount of power required by a device that is driven by the power generated by the fuel cell stack 16. When the target pressure is calculated, the adjustment processing proceeds to step S2.

In step S2, the controller 26 controls the discharge path stop valve 20 to set the opening degree of the discharge path stop valve 20 to the opening degree corresponding to the target pressure calculated in step S1. The controller 26 acquires the opening degree corresponding to the target pressure using a table or a relational expression indicating the relationship between the opening degree and the pressure. This table or relational expression is stored in the storage medium 54. The controller 26 decreases the opening degree as the target pressure increases.

While the fuel cell stack 16 is generating power, the discharge path stop valve 20 cannot be closed. Therefore, a predetermined lower limit opening degree is set for the discharge path stop valve 20 in advance. When the opening degree corresponding to the target pressure calculated in step S1 is lower than the lower limit opening degree of the discharge path stop valve 20, the controller 26 sets the opening degree of the discharge path stop valve 20 to the lower limit opening degree. When the opening degree of the discharge path stop valve 20 is set, the adjustment processing proceeds to step S3.

In step S3, the controller 26 acquires the amounts of the oxygen-containing gas required respectively for the target pressure calculated in step S1 and the target generated power amount of the fuel cell stack 16. The controller 26 acquires the amount of the oxygen-containing gas supplied, using a map indicating the relationship between the pressure with the amount of power generated and the amount of the oxygen-containing gas supplied.

The map is created in consideration of the amount of oxygen-containing gas required for power generation and the amount of oxygen-containing gas required for applying pressure to the oxygen-containing gas flow field 46 inside the fuel cell stack 16, and is stored in the storage medium 54. When the amount of the oxygen-containing gas to be supplied is acquired, the adjustment processing proceeds to step S4.

In step S4, the controller 26 sets, as the target supply amount of the oxygen-containing gas supplied to the fuel cell stack 16, the amount of the oxygen-containing gas acquired in step S3 or the amount of the oxygen-containing gas required for the target generated power amount, whichever is larger.

At the opening degree of the discharge path stop valve 20 set in step S2, the internal pressure at the oxygen-containing gas flow field increased by the discharge path stop valve 20 may not reach the target pressure. In this case, the amount of the oxygen-containing gas acquired in step S3 becomes larger than the amount of oxygen-containing gas required for the target generated power amount. On the other hand, when the internal pressure at the oxygen-containing gas flow field reaches the target pressure, the amount of oxygen-containing gas required for the target generated power amount becomes larger than the amount of oxygen-containing gas acquired in step S3. As described above, the internal pressure at the oxygen-containing gas flow field is the pressure at the oxygen-containing gas flow field 46 formed inside the fuel cell stack 16. When the target supply amount is set, the adjustment processing proceeds to step S5.

In step S5, the controller 26 controls the oxygen-containing gas supplier 12 to adjust the current flow rate of the oxygen-containing gas to a flow rate corresponding to the target supply amount. That is, the controller 26 starts to cause the oxygen-containing gas supplier 12 to supply the oxygen-containing gas in the target supply amount set in step S4. When the flow rate of the oxygen-containing gas is adjusted, the adjustment processing proceeds to step S6.

In step S6, the controller 26 calculates the flow rate of the oxygen-containing gas flowing through the bypass channel 38 (the amount of gas supplied for bypassing). When the target supply amount of the oxygen-containing gas set in step S4 is larger than the amount of the oxygen-containing gas required for the target generated power amount, there is an extra oxygen-containing gas unnecessary for power generation. In order to cause the extra oxygen-containing gas to flow through the bypass channel 38, the controller 26 calculates a difference between the target supply amount of the oxygen-containing gas set in step S4 and the amount of the oxygen-containing gas required for the target generated power amount. Specifically, the amount of oxygen-containing gas required for the target generated power amount is subtracted from the target supply amount.

When the amount of oxygen-containing gas required for the target generated power amount is larger than the target supply amount of oxygen-containing gas set in step S4, the controller 26 calculates the amount of gas supplied for bypassing as zero. When the amount supplied for bypassing is calculated, the adjustment processing proceeds to step S7.

In step S7, the controller 26 controls the bypass valve 22 to set the opening degree of the bypass valve 22 to an opening degree corresponding to the amount of gas supplied for bypassing. The controller 26 acquires the opening degree corresponding to the target pressure using a table or a relational expression indicating the relationship between the amount of gas and the opening degree. This table or relational expression is stored in the storage medium 54. The controller 26 increases the opening degree of the bypass valve 22 as the amount of gas supplied for bypassing increases.

When the amount of gas supplied for bypassing is zero, the controller 26 sets the opening degree of the bypass valve 22 to zero. That is, the controller 26 closes the bypass valve 22. Once the opening degree of the bypass valve 22 is set, the adjustment processing is ended.

As described above, when the internal pressure at the oxygen-containing gas flow field does not reach the target pressure, the controller 26 intentionally causes the oxygen-containing gas supplier 12 to supply the oxygen-containing gas in a target supply amount larger than the amount of the oxygen-containing gas required for the target generated power amount. In this case, the controller 26 supplies the extra oxygen-containing gas unnecessary for power generation to the pressure regulator 24 via the bypass channel 38. As a result, the fuel cell stack 16 can be caused to generate the target amount of power while the pressure regulator 24 increases the internal pressure at the oxygen-containing gas flow field. As a result, the electrolyte membrane 43 can be prevented from drying without decreasing the power generation efficiency.

The above-described embodiment may be modified as follows.

Modified Embodiment 1

Figure 3:
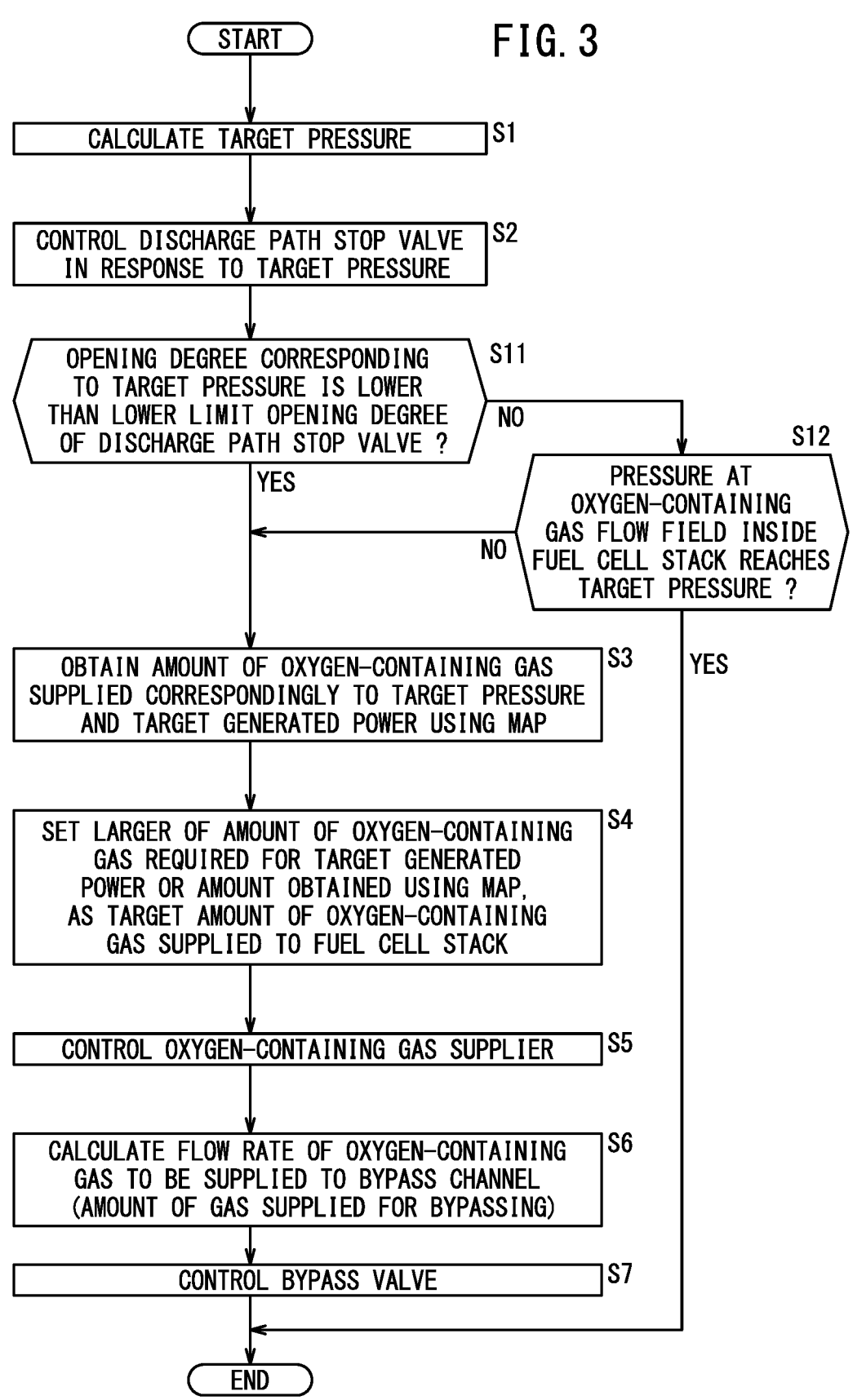
FIG. 3 is a flowchart showing a procedure of adjustment processing according to a modified embodiment.

FIG. 3 is a flowchart showing a procedure of adjustment processing according to a modified embodiment. In the adjustment processing according to the modified embodiment 1, each processing of step S11 and step S12 is newly incorporated. Each processing of step S11 and step S12 is executed between the processing of step S2 and the processing of step S3.

That is, when the opening degree of the discharge path stop valve 20 is set in step S2, the adjustment processing according to the modified embodiment 1 proceeds to step S11.

In step S11, the controller 26 compares the opening degree corresponding to the target pressure calculated in step S1 with the lower limit opening degree of the discharge path stop valve 20. In the case where the opening degree corresponding to the target pressure is less than the lower limit opening degree of the discharge path stop valve 20 (step S11: YES), the adjustment processing proceeds to step S3. On the other hand, when the opening degree corresponding to the target pressure is equal to or larger than the lower limit opening degree of the discharge path stop valve 20 (step S11: NO), the adjustment processing proceeds to step S12.

In step S12, the controller 26 compares the pressures in the oxygen-containing gas flow field 46 detected by the sensor 62 (the internal pressure at the oxygen-containing gas flow field) with the target pressure calculated in step S1. If the internal pressure at the oxygen-containing gas flow field has not reached the target pressure (step S12: NO), the adjustment process proceeds to step S3. On the other hand, if the internal pressure at the oxygen-containing gas flow field has reached the target pressure (step S12: YES), the adjustment processing ends.

As described above, in the present modification, the target supply amount is set only in the case where the following first condition is met. The first condition is a situation in which the internal pressure at the oxygen-containing gas flow field does not reach the target pressure even when the opening degree of the discharge path stop valve 20 is set equal to or less than the opening degree corresponding to the target pressure; or a situation in which the opening degree corresponding to the target pressure is lower than the lower limit opening degree of the discharge path stop valve 20. This makes it possible to avoid unnecessary control of the oxygen-containing gas supplier 12. As a result, the loads on the oxygen-containing gas supplier 12 and the controller 26 can be reduced.

Modified Embodiment 2

In the case of the following second condition, the controller 26 may set the last set target supply amount as the current target supply amount. The second condition is a situation in which the amount of the oxygen-containing gas acquired this time using the map is larger than the amount of the oxygen-containing gas required for the target generated power amount. In addition to this, the second condition is a situation in which the amount of the oxygen-containing gas acquired this time using the map is larger than the last set target supply amount.

Therefore, even when the target supply amount rapidly decreases, the pressure regulator 24 can cause the oxygen-containing gas supplier 12 to supply the oxygen-containing gas in an amount required for keeping the pressure at the oxygen-containing gas flow field 46 inside the fuel cell stack 16 high.

Modified Embodiment 3

The above-described embodiments and modifications may be arbitrarily combined within a range not departing from the object of the present invention.

A description will be given below concerning the invention and effects that are capable of being grasped from the above descriptions.

(1) The fuel cell system (10) according to an aspect of the present invention includes: the fuel cell stack (16) configured to generate electric power by chemical reactions between a fuel gas and an oxygen-containing gas; the oxygen-containing gas supply flow path (30) connected to the fuel cell stack; the oxygen-containing gas discharge flow path (32) connected to the fuel cell stack; the humidifier (14) disposed on the oxygen-containing gas supply flow path and configured to humidify the oxygen-containing gas flowing through the oxygen-containing gas supply flow path; the discharge path stop valve (20) disposed on the oxygen-containing gas discharge flow path and configured to be opened while the fuel cell stack is generating electric power; and the pressure regulator (24) disposed downstream of the discharge path stop valve and configured to regulate a pressure on an upstream side to be higher than a pressure on a downstream side.

In this way, even if the discharge path stop valve is kept opened while the fuel cell stack is generating power, it is possible to increase the pressure at the oxygen-containing gas flow field inside the fuel cell stack. As a result, because the amount of water contained in the oxygen-containing gas is increased as compared with the case where the pressure regulator is not provided, drying of the electrolyte membrane can be suppressed.

(2) The fuel cell system according to an aspect of the present invention further includes: the oxygen-containing gas supplier (12) configured to supply the oxygen-containing gas to the fuel cell stack through the oxygen-containing gas supply flow path; the bypass channel (38) branching from the oxygen-containing gas supply flow path and merged with the oxygen-containing gas discharge flow path at a point between the regulator and the discharge path stop valve; the bypass valve (22) disposed on the bypass channel and configured to adjust a flow rate of the oxygen-containing gas flowing through the bypass channel; and the controller (26) configured to control the oxygen-containing gas supplier and the bypass valve, wherein the controller sets the target supply amount of the oxygen-containing gas supplied to the fuel cell stack based on the target pressure at the oxygen-containing gas flow field (46) inside the fuel cell stack and the target generated power amount of the fuel cell stack; controls the oxygen-containing gas supplier to supply the oxygen-containing gas in the target supply amount; and adjust the opening degree of the bypass valve corresponding to the target supply amount. In this way, the pressure regulator can allow the fuel cell stack to generate power at the target generated power amount while increasing the pressure at the oxygen-containing gas flow field. Furthermore, the electrolyte membrane can be prevented from drying without decreasing the power generation efficiency.

(3) In the fuel cell system according to an aspect of the present invention, the controller may acquire the amount of the oxygen-containing gas corresponding to the target pressure and the amount of supply of the oxygen-containing gas corresponding to the target generated power amount by using the map indicating the relationships of an amount of supply of the oxygen-containing gas with the pressure and the generated power amount, and may set the target supply amount to the larger of the amount corresponding to the target pressure or the amount corresponding to the target generated power amount. In this way, the target supply amount can be set appropriately by using the pressure regulator to cause the fuel cell stack to generate power at the target generated power amount while increasing the pressure at the oxygen-containing gas flow field.

(4) In the fuel cell system according to the aspect of the invention, the controller may set the target supply amount at the predetermined cycle, and the controller may set the last set target supply amount as the current target supply amount in the case where the amount of supply currently acquired is larger than the amount of the oxygen-containing gas required for the target generated power amount and larger than the last set target supply amount. In this way, even when the target supply amount rapidly decreases, the pressure regulator can cause the oxygen-containing gas supplier to supply the oxygen-containing gas in an amount required for increasing the pressure at the oxygen-containing gas flow field.

(5) In the fuel cell system according to the aspect of the invention, the controller may set the opening degree of the bypass valve correspondingly to the difference between the target supply amount and the amount of the oxygen-containing gas required for the target generated power amount in the case where the target supply amount is larger than the amount of the oxygen-containing gas required for the target generated power amount. Thus, it is possible to cause the fuel cell stack to appropriately execute power generation in the target generated power amount.

(6) In the fuel cell system according to the aspect of the invention, the controller may set the target supply amount in the case in which the internal pressure at the oxygen-containing gas flow field is lower than the target pressure even when the opening degree of the discharge path stop valve is set equal to or lower than the opening degree corresponding to the target pressure, or the case in which the opening degree corresponding to the target pressure is lower than the lower limit opening degree of the discharge path stop valve. This makes it possible to avoid unnecessary control of the oxygen-containing gas supplier. As a result, the load on the oxygen-containing gas supplier and the controller can be reduced.

The present invention is not limited to the above disclosure, and various modifications are possible without departing from the essence and gist of the present invention.

The invention claimed is:

1. A fuel cell system comprising:
a fuel cell stack configured to generate electric power by chemical reactions between a fuel gas and an oxygen-containing gas;
an oxygen-containing gas supply flow path connected to the fuel cell stack;
an oxygen-containing gas discharge flow path connected to the fuel cell stack;
a humidifier disposed on the oxygen-containing gas supply flow path and configured to humidify the oxygen-containing gas flowing through the oxygen-containing gas supply flow path;
a discharge path stop valve disposed on the oxygen-containing gas discharge flow path and configured to be opened while the fuel cell stack is generating electric power;
a pressure regulator disposed downstream of the discharge path stop valve and configured to regulate a pressure on an upstream side to be higher than a pressure on a downstream side;
an oxygen-containing gas supplier configured to supply the oxygen-containing gas to the fuel cell stack through the oxygen-containing gas supply flow path;
a bypass channel branching off from the oxygen-containing gas supply flow path and merged with the oxygen-containing gas discharge flow path at a point between an upstream of the pressure regulator and a downstream of the discharge path stop valve;
a bypass valve disposed on the bypass channel and configured to adjust a flow rate of the oxygen-containing gas flowing through the bypass channel; and
a controller comprising one or more processors that are configured to execute computer-executable instructions stored in a memory, wherein the one or more processors execute the computer-executable instructions to cause the controller to:
set a target supply amount of the oxygen-containing gas supplied to the fuel cell stack based on a target pressure at an oxygen-containing gas flow field inside the fuel cell stack and a target generated power amount of the fuel cell stack;
control the oxygen-containing gas supplier to supply the oxygen-containing gas in the target supply amount; and
adjust an opening degree of the bypass valve corresponding to the target supply amount.

2. The fuel cell system according to claim 1, wherein the one or more processors cause the controller to:
acquire an amount of supply of the oxygen-containing gas corresponding to the target pressure and an amount of the oxygen-containing gas required for the target generated power amount by using a map indicating relationships of an amount of the oxygen-containing gas with a pressure and a generated power amount; and
set the target supply amount to a larger of the amount of supply corresponding to the target pressure or the amount of the oxygen-containing gas required for the target generated power amount.

3. The fuel cell system according to claim 2, wherein the one or more processors cause the controller to:
set the target supply amount at a predetermined cycle; and
set a last set target supply amount as a current target supply amount in a case where an amount of supply currently acquired is larger than the amount of the oxygen-containing gas required for the target generated power amount and larger than the last set target supply amount.

4. The fuel cell system according to claim 1, wherein the one or more processors cause the controller to:

set an opening degree of the bypass valve correspondingly to a difference between the target supply amount and an amount of the oxygen-containing gas required for the target generated power amount in a case where the target supply amount is larger than the amount of the oxygen-containing gas required for the target generated power amount.

5. The fuel cell system according to claim 1, wherein the one or more processors cause the controller to:

set the target supply amount in a case in which an internal pressure at the oxygen-containing gas flow field is lower than the target pressure even when an opening degree of the discharge path stop valve is set equal to or lower than an opening degree corresponding to the target pressure, or a case in which the opening degree corresponding to the target pressure is lower than a lower limit opening degree of the discharge path stop valve.

\* \* \* \* \*